United States Patent [19]

Kuceski

[11] 4,182,844

[45] Jan. 8, 1980

[54] PREPARATION OF POLYAMINOAMIDE RESIN IN THE ABSENCE OF WATER

[75] Inventor: Vincent P. Kuceski, Elmwood Heights, Ill.

[73] Assignee: The C.P. Hall Company, Chicago, Ill.

[21] Appl. No.: 938,777

[22] Filed: Sep. 1, 1978

Related U.S. Application Data

[63] Continuation-in-part of Ser. No. 754,644, Dec. 27, 1976, abandoned, which is a continuation of Ser. No. 403,131, Jan. 2, 1974, abandoned.

[51] Int. Cl.$^2$ ............................................... C08G 69/28
[52] U.S. Cl. ..................................... 528/335; 528/342; 528/345; 528/347; 528/350
[58] Field of Search ............... 528/335, 342, 345, 347, 528/350

[56] References Cited

U.S. PATENT DOCUMENTS

| | | | |
|---|---|---|---|
| 2,461,495 | 2/1949 | Floyd et al. | 528/335 |
| 2,570,180 | 10/1951 | Allewelt | 528/335 |
| 2,632,748 | 3/1953 | Caldwell | 528/335 |
| 2,671,071 | 3/1954 | Laakso et al. | 528/335 |
| 3,139,417 | 6/1964 | Duxbury | 528/335 |
| 3,194,794 | 7/1965 | Caldwell et al. | 528/335 |
| 3,329,653 | 7/1967 | Beavers et al. | 528/335 |
| 3,379,695 | 4/1968 | Wolfes et al. | 528/335 |
| 3,459,714 | 8/1969 | Wolfes et al. | 528/335 |
| 3,634,362 | 1/1972 | Oldham | 528/335 |
| 3,887,510 | 6/1975 | Chan et al. | 260/29.2 N |

*Primary Examiner*—Harold D. Anderson
*Attorney, Agent, or Firm*—Mason, Kolehmainen, Rathburn & Wyss

[57] ABSTRACT

An energy-conserving method for the manufacture of polyaminoamides is described which involves the reaction of a polycarboxylate ester with a mono and/or polyalkylene polyamine in the presence of 0 to about 5% by weight water by heating approximately stoichiometric proportions of the two reactants to the temperature at which the amidification reaction becomes self-sustaining, then utilizing the exothermic heat of reaction to sustain the reaction at a desired temperature. During the reaction, the heat of reaction is used to vaporize an alcohol reaction product and remove the alcohol from the reaction vessel and from further contact with the reaction vessel contents. The following equation illustrates the reaction in the substantial absence of water (0 to about 5% by weight) using a methyl ester and an amine:

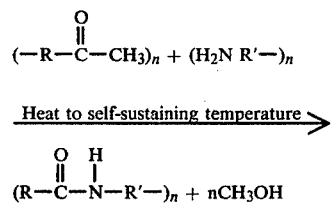

9 Claims, No Drawings

PREPARATION OF POLYAMINOAMIDE RESIN IN THE ABSENCE OF WATER

CROSS REFERENCE TO RELATED APPLICATIONS

This application is a continuation-in-part of applicant's application Ser. No. 754,644, filed Dec. 27, 1976, now abandoned, which is a continuation of Ser. No. 403,131, filed Jan. 2, 1974, now abandoned.

FIELD OF THE INVENTION

This invention relates to a novel method of producing certain polyaminoamides by the reaction of a carboxylate ester with an amine. Relatively pure polymers are produced directly in high yields. There is a substantial saving in raw material costs and in the labor and equipment involved. The polymeric water-soluble cationic resins that are produced are useful for the preparation of water-proof coatings for paper, wetstrength resins for paper, etc.

PRIOR ART

According to the prior art, linear polyaminoamides are usually made by reacting a dicarboxylic acid with a hydrocarbon di amine. If the polyaminoamide is to be applied to paper or textile from water solution then the polyamide obtained must be water soluble, or at least water dispersible in order to coat paper or textiles economically. The reaction, according to the various prior art procedures, generally is carried out by first adding water to the reaction vessel, then adding the polyamine, and finally adding adipic acid or some other aliphatic water-soluble dicarboxylic acid. The added water is present during the reaction of the polyamine with the dicarboxylic acid. Such prior art is described in U.S. Pat. Nos. 2,926,154, 3,197,427, 3,442,754, and 3,250,664. Water is added to the reaction flask and enters into the reaction of the acid with the amine to aid in dissolving the acid, to prevent a violent reaction from occurring between the acid and the amine, and to help prevent undesirable reactions between the polyamine secondary group and the acid. A substantial quantity of heat is evolved between the acid and the polyamine because of the exothermic acid-base reaction, but considerably more heat must be applied to break the acid-based salt complex reaction product by dehydration to form the desired acid amine. The following equation illustrates the usual prior-art reaction:

the complex salt after the completion of the acid-base reaction and considerable heat energy is required.

In another prior art process, as disclosed in the Chan et al. U.S. Pat. No. 3,887,510, a polyalkylene polyamine is reacted with a polycarboxylate ester, but the alcohol reaction product is refluxed back to the reaction vessel and is not removed therefrom. The substantial quantity of alcohol reaction product substantially dilutes the reactants thereby necessitating the continuous input of energy (heat) to the reaction vessel contents to maintain the reaction.

SUMMARY OF THE INVENTION

In accordance with the present invention, it has been found that the substantial elimination of water or other solvent (0 to about 5% by weight) from the polyaminepolycarboxylate ester reaction, together with continuous and permanent removal of the alcohol reaction product from the reaction vessel, permits the use of the exothermic heat of reaction of the polyamine and the polycarboxylate ester to supply the major portion of the heat needed for substantially complete reaction of a desired quantity of polyamine and polycarboxylate ester to provide an interior, even heating source capable of providing a uniform temperature to the remaining unreacted reactants throughout the reaction vessel, and to provide sufficient internally generated heat for vaporization and removal of the alcohol from the reaction vessel. During the course of the reaction, after the reaction begins, an additional outside heating source is used during a portion of reaction cycle only to maintain the reactants at a desired optimum temperature. The major portion of the heat of reaction is supplied by the reaction itself once the reaction begins.

An object of the present invention is to provide a method of making polyaminoamides by the reaction of one or more polyalkylene polyamines with one or more polycarboxylate esters by carrying out the reaction in substantial absence of water to provide a relatively high concentration of reactants, and particularly a relatively high concentration of functional (amino) groups. The relatively high concentration of functional groups provides sufficient heat, once the reaction begins, to sustain the reaction until substantial completion without the addition of further heat. An exterior heating source may be added periodically to maintain a desired reaction temperature.

Another object of the present invention is to provide a method for reacting one or more polyalkylene poly-

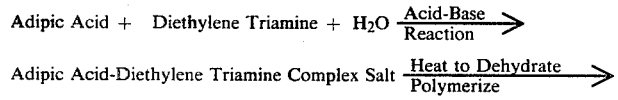

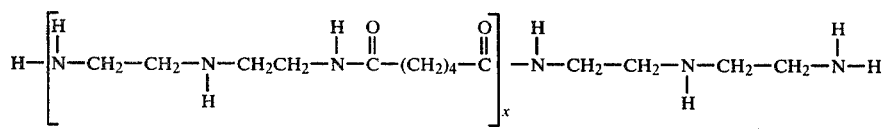

in which x=any large integer, i.e. to. The polyamide may be terminated by amine groups at both ends as shown, or it may be terminated by carboxyl groups from unreacted end groups on adipic acid, or it may have an amine group at one end and a carboxyl group at the other end. Water is eliminated by the dehydration of amines with one or more polycarboxylate esters without more than about 5% by weight water to provide sufficient exothermic heat of reaction to continuously drive off a substantial proportion of an alcohol reaction product during the course of the reaction. Remaining alcohol reaction product can be removed after completion of the reaction.

Another object of the present invention is to provide a method for reacting one or more polyalkylene polyamides with one or more polycarboxylate esters without more than 5% by weight water to provide sufficient exothermic heat of reaction to use this heat of reaction to provide a major portion of the heat of reaction to the reactants, once the reaction has proceeded to a point where it is observed that after removal of the heat source, the temperature of the reaction vessel contents rises. The temperature at which the heat source can be removed initially will vary depending upon the particular reactants but can be determined easily by providing a temperature sufficient to start the reaction and then removing the heat source at predetermined temperature increments of the reaction vessel contents. The temperature of reaction vessel contents at which the reaction can continue without supplying additional heat is reached when, upon removal of heat, the temperature of the reaction vessel contents continues to rise.

Another object of the present invention is to provide a method for reacting one or more polyalkylene polyamines with one or more polycarboxylate esters without more than about 5% by weight water to provide sufficient exothermic heat of reaction to continuously drive off a and to sustain the reaction substantially exclusively by utilizing the heat of reaction.

Another object of the present invention is to provide a method for reacting one or more polyalkylene polyamines with one or more polycarboxylate esters without more than 5% by weight water to provide sufficient exothermic heat of reaction to provide a polyaminoamide reaction product having improved water solubility.

Another object of the present invention is to avoid more than about 5% by weight water from entering into the reaction which must be removed eventually in any case in order to obtain temperatures high enough to bring about the dehydration of the carboxylate-amino salt complex. The extra energy requirements to remove water which is subsequently added back, in prior art processes, is uneconomical, time-consuming and wasteful of valuable energy fuel.

Another object of the invention is to obtain a more closely controlled reaction by reacting a polyalkylene polyamine with a polycarboxylate ester, in the presence of no more than about 5% water and utilizing the heat liberated in this exothermic reaction to drive off an alcohol reaction product and to sustain the reaction. In this manner, the amide formation takes place prefentially, forming end amine groups rather than secondary amine groups as a result of the more concentrated reactants in the absence of water. The resulting polyaminoamides have improved water solubility making them particularly valuable for coatings or impregnation of substrates from water solution.

According to this invention, the polyaminoamides are produced by the reaction of a polycarboxylate ester and an amine in the absence of water. The reaction thermodynamically favors amide formation without passing through a carboxylic acid-amine salt complex, thus:

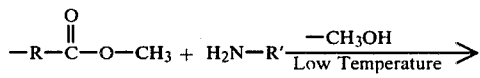

-continued

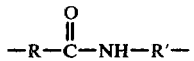

R and R' having the aforesaid values as indicated by the prior art. Thus, the reaction is a one-step reaction, whereas the favored prior-art reaction of a poly-carboxylic acid with a polyamine is a two-step reaction. The reaction by the process of this invention proceeds quickly at a relatively low temperature.

In carrying out the reaction, a lower, alkyl ester of a polycarboxylic acid is used in which the alkyl group of the ester preferably contains 1 to 4 and may contain as many as 10 or 12 or more carbon atoms, and the polycarboxylic acid may contain 2 to as many as 36 carbon atoms, preferably 2–10 carbon atoms. The acid will usually be a dicarboxylic acid, but may be a tricarboxylic or tetracarboxylic acid. It may be a saturated or unsaturated acid. Thus, the esters include the methyl, ethyl, propyl, butyl, amyl, hexyl, heptyl, octyl, nonyl or decyl, (straight-chain, branched chain or cyclic) esters of succinic, glutaric, adipic, pimelic, suberic, azelaic, sebacic, hendecanedioic, dodecandioic, brassylic, tetradecandioic, bentadecandioic, trapsic, citric, tartaric, aconitic and tricarballylic acids.

Unsaturated dibasic esters may be used such as esters of maleic acid, dimer acids, or trimer acids. Aromatic esters may be used such as the dibasic and tribasic esters which include esters of phthalic, m-phthalic, and terephthalic acids.

Thus, the esters used may be di, tri, or polycarboxylic; the alcohol residues may be straight-chain or branched or cyclic; they may be aliphatic or aromatic; they may be saturated or unsaturated. It may sometimes be desirable to use a high proportion of an economical aromatic dibasic acid, such as a lower molecular weight diester of phthalic acid, and it may be entirely a commercial grade of such a diester. The preferred esters are those of the lower molecular-weight alcohols such as methyl, ethyl, propyl and butyl, because they are more easily removed from the reaction mixture by distillation; methanol being usually preferred because it is presently the lowest in cost, the most easily distilled from the reaction system, and the most reactive with amines. A commercial grade of succinic or glutaric acid methyl esters may be preferred, and it may be mixed with a high proportion of an economical aromatic acid.

A convenient source for esters which are used in this invention is described in Kuceski U.S. Pat. Nos. 2,824,122 and 2,824,123, which relate to the esters made from dicarboxylic acids in sidestream and wastestreams resulting from nitric acid oxidation of petroleum chemicals and fats and fatty acids.

Both the acid form as well as the ester form of the various polybasic acids can be used together to optimize manufacturing costs or performance requirements, or both. Thus, phthalic acid may be used with methyl esters of glutaric acid to give a low-cost product. Phthalic acid usually gives dark-colored products, but its color may be improved by use of about an equal molar proportion of an aliphatic dibasic acid ester. Usually if phthalic anhydride or phthalic ester is used, it is added at the start of the reaction, followed by the ester of the aliphatic dicarboxylic acid.

The polyamines which can be used in making the resin are usually polyalkylene amines or aliphatic diamines and polyamines and may contain aliphatic ether, halogen and alcohol groups, and include cyclic as well as straightchain compounds. They include polyethylene polyamines, propylene diamine, polypropylene amines, polyethylene glycol alpha- and omega-amines, hexamethylene diamine, dicyclohexylene diamine, tallow diamines, tridecyl ether diamine, bis(-hexamethylene) triamine, amino-ethylethanolamine; aromatic polyamines such as polymethylene polyphenyl aromatic polyamines such as polymethylene polyphenyl amine, p,p' methylene dianiline, piperizine, N, N-bis(3- aminopropylmethyl) amine, and the like. The amines which are preferred are the amines based on ethylene such as ethylene diamine, diethylenetriamine, triethylenetetramine, tetraethylene pentamine, hexamethylene diamine and mixtures of such amines. Thus, the amines may be aliphatic or aromatic but must contain at least two amino groups separated by at least two carbon atoms. The crude mixtures of difunctional amines obtained when ammonia is reacted with mixtures containing 1,2-ethylene dichloride, propylene dichloride, etc., may be used without extensive refinement except for removal of water, excess ammonia, and unreacted chlorides. The removal of water from the reactants, such that the reaction vessel contains no more than 5% by weight water, is especially important to assure that no substantial quantity of water enters into the reaction of the polyamine with the polycarboxylate ester. An alkylene diamine or dialkylene triamine in which the alkylene group or groups contain 2 or 3 carbon atoms is preferred. The amines may also contain other groups such as hydroxyl, ether and halogen ester groups, etc. Ethanolamine, diethanolamine, and triethanolamine may be used. In the latter case, the hydroxyl and amino groups react.

When the reaction is carried out, the amount of diester to be used is that amount which will react approximately stoichiometrically with the primary amino groups of the polyamine. To achieve the full advantage of the present invention, the mole ratio of diester to polyamine is $$\frac{\text{diester}}{\text{polyamine}} = \frac{0.7 - 1.25}{1} \text{ or preferably } \frac{0.85 - 1.1}{1}.$$

When dicarboxylic acids are used at the outer limits of their ratios, in the prior-art procedures, such as at mole ratios of 1.25 to 1.5, it was found that gelled products were obtained. When the diesters were used, although lower molecular weight products can be obtained, when the ratio is in the range of 1.25 to 1.5, the tendency to form gel is greatly decreased, which indicates that the crosslinking reaction between secondary amino groups and the ester does not occur to as great an extent as when dicarboxylic acids are used. This in itself is surprising since one would expect that the secondary amine groups would react comparably faster with ester groups than with carboxylic groups.

The reaction temperature at which the reaction is self sustaining is usually from 35° F. to 125° F. (20° C. to 70° C.) lower than that used in the dicarboxylic acid-amine reaction. The temperatures generally needed to initiate the reaction between the polyalkylene polyamine and the polycarboxylic ester are in the range of about 60° C. to 200° C. If ethylene diamine (ED) and dimethylglutarate are used, the temperature required to initiate the reaction may be as low as 60° C. In fact, if equal amounts of DMG and ED are mixed in a thermos bottle at 24° C., the reaction will take place without any application of heat over a period of several hours. Sufficient initial heating is provided to yield a self-sustained reaction when, upon removal of heat, the temperature of the reaction vessel contents continues to rise. By providing the majority of heat from the heat of reaction, there results a smaller amount of side reactions, lower reactivity with secondary amine groups, and consequently, better long-chain polymers, and the reaction proceeds more controllably. Methanol or other lowboiling alcohol is evolved easily at a low temperature, and vacuum is often not necessary to drive the reaction to completion, as is necessary in the carboxylic acidamine reaction.

The polyamide which has been formed by the reaction mentioned above is reacted with epichlorohydrin at a temperature of about 50° C. to about 100° C. and usually between 60° C. and 70° C. until the viscosity of a 20 per cent solid solution at 25° C. has reached about C or higher on the viscosity scale known as the GarnderHoldt scale. Generally this viscosity seems easier to reach when the diesters are used than when the corresponding dicarboxylic acid is used in producing the reaction product.

Although the above discussion relates to the use of the diesters in general in making the polyamide resins we have found that the resins giving preferred results are those made when the diester of glutaric acid is used. Esters of succinic and adipic acids are sometimes preferred, and mixtures of these and esters of glutaric acid may be conventionally used. From the standpoint of cost, of course, the crude dimethyl ester of adipic acid plant bleedstream dicarboxylic acids are the most economical although other esters could be used. When dicarboxylic acids are used to form the polyamide, as in the prior art, it is necessary to add much more chlorohydrin than theoretically necessary to convert all secondary amine groups to tertiary amine groups and quarternary nitrogen groups. When dimethyl glutarate is used, there are more free secondary groups and less free primary groups and, therefore, less chlorohydrin is necessary to reach the molecular weight desired as shown by the viscosity of the product. Instead of usually requiring from 1.1 moles to 1.5 moles of chlorohydrin per mole of theoretical secondary groups present, usually only 1.0 to 1.2 moles are required by process of this invention to reach the same viscosity or molecular weight.

When the reactants reach a self-sustaining temperature, heat is removed from the reactants, generally until a point in the course of the reaction when a major portion of the reaction has occurred and much of the heat liberated in further reaction is used to heat reaction product. Accordingly, after a majority of the reaction, it may be desirable to achieve optimum polymer quality and to complete the reaction within a relatively short time, to add heat to the reaction vessel when the temperature falls below a desired minimum temperature. The additional heat is not necessary, however, since the reaction will continue to proceed to completion over a relatively long time span. Water can be added to the reaction product mixture after the reaction of the polyalkylene polyamine with the polycarboxylate ester is substantially complete, if desired, for further reactions or for use in solution.

The resins which result may be incorporated into a pulp slurry at any point on the wet end of a paper making machine. Usually from 0.25 to 3% of the resin (based on the dry weight of the pulp) is used. However, more may be used if desired.

The invention is further described in the examples which follow. In examples 1 and 3, dicarboxylic acid was used in making the resin, following generally the procedure of U.S. Pat. No. 2,926,154, and examples 2 and 4 were made by the process of this invention. The various resins were tested by adding 1% of resin to bleached Kraft paper pulp and hand sheets were prepared on a Noble and Wood machine. Measurements on the various sheets were made according to standard methods as given in Technical Association Of The Pulp And Paper Industry (TAPPI). for testing wet strengths. The results are recorded in the table which follows the examples.

EXAMPLE 1 (Prior Art)

2.18 moles of diethylene triamine and 100 grams of water were placed in a 3-necked flask equipped with a mechanical stirrer, thermometer and extra-capacity, efficient condenser. To this was added 290 grams (2.0 moles) of adipic acid. After the acid has dissolved in the amine, the solution was heated to 185°–200° C. and held there for 1½ hours. Then vacuum from a water pump was applied to the flask during the period required for the contents of the flask to cool to 140° C. following which 430 grams of $H_2O$ was added. The polyamide solution contained 52.3% solids and had an acid number of 2.1.

To 60 grams of this polyamide solution in a round-bottom flask was added 225 grams of $H_2O$. This solution was heated to 50° C. and 12.5 grams of epichlorohydrin was added dropwise over a period of 11 minutes. The contents of the flask was then heated to 60°–70° C. until it had attained a Gardner viscosity of E. Then 150 grams of $H_2O$ was added to the product, and it was colled to 25° C. Eleven ml. of 10% HCl was then added to adjust the pH to 5.0, The product contained 9.0% solids and had a Gardner viscosity of C-D.

The solution was adjusted to a pH of 9.0 with 10% NaOH and 1% of the resin was added to pulp as described.

EXAMPLE 2

A polyaminoamide was prepared by adding 2.18 moles (225grams) of diethylene triamine to the same laboratory scale apparatus described in Example 1. To this was added 2 moles (348 grams) of dimethyl adipate. The mixture was then heated to about 125° C. when the reaction forming the amide took place with evolution of methanol. Heat was removed and the self-sustaining reaction continued at a temperature of 125°–140° C. until the reaction was about 80 percent complete and heat was then reapplied to hold the temperature at 140°–150° C. until the reaction was essentially complete as shown by the quantity of methanol recovered through the condenser (125 grams). The time of heating at 140°–150° C. was about 1 hour; however, to insure that the reaction was complete, the mixture was then heated for one-half hour from 150° C. to 180° C. No vacuum was applied throughout the reaction. Then 430 grams of water was added, after the flask was allowed to cool to 140° C. The resulting polyaminoamide had a solids content of 52.69 percent.

To 60 grams of this polyamide solution was added 225 grams of $H_2O$. This solution was heated to 50° C. and 12.5 grams of epichlorohydrin was added dropwise over a period of 10 minutes. The mixture was then heated at 60°–70° C. until it attained a Gardner Viscosity of greater than E. One hundred fifty grams of water was added to the product and the mixture cooled to 25° C. Twelve ml. of 10 percent HCl was added to adjust the pH to 5.0. The product contained 9.17 solids and had a Gardner Viscosity of C-D.

EXAMPLE 3 (Prior Art)

In the same reaction vessel apparatus as given in Examples 1 and 2, diethylenetriamine (225 grams) (2.18 moles) was reacted with 364 grams of a solution containing 264 grams (2.0 moles) of dry crystallized glutaric acid obtained from the hydrolysis of a commercial dimethyl glutarate having the following analysis:

| | |
|---|---|
| Dimethyl glutarate | 98.0% |
| Dimethyl succinate | 0.8% |
| Dimethyl adipate | 1.2% |
| Nitrogen content | 400 ppm |

The glutaric acid obtained was presumed to have approximately the same analysis. The acid reacted vigorously with the diethylene triamine and cooling had to be applied to keep the reaction under control to try to minimize undesirable secondary amine reactions with the glutaric acid. After the acid had reacted with the amine the mixture was heated slowly to 185° C. over a period of two hours to minimize losses and finally heated at 185°–200° C. for 1.5 hours. Then vacuum was applied to dehydrate the reaction mixture further until the temperature dropped to 140° C. Then 410 grams of water was added to give a solid content of 50 percent.

To 60 grams of this solution was added 225 grams of $H_2O$. This solution was heated to 50° C. and 12.5 grams of epichlorohydrin were added dropwise over a period of 10 minutes. This solution was then heated at 60°–70° C. until a Gardner Viscosity of greater than E was reached. Then 150 grams of $H_2O$ was added and the solution was cooled to 25° C. Eleven ml. of 10 percent HCl was added to give a pH of 5.1. The product contained 9.5 per cent solids and had a viscosity of C.

EXAMPLE 4

Three hundred twenty grams of dimethyl glutarate (2.0 moles) and 225 grams (2.18 moles) of diethylene triamine were added to a 1-liter flask equipped as given in Example 1. No heat was evolved on mixing these two compounds. The mixture was then heated to 130° C. When heat was removed and the reaction then became self-sustaining. During this time of spontaneous reaction the temperature rose to 145° C. and about 100 grams of methanol evolved or about 75 percent of theory. Heating was then continued over a period of 1.5 hours while the temperature rose to 175° C. and then vacuum was applied to remove all residual methanol of reaction. The flask was cooled to 140° C. and 410 grams of water was added to give a solids content of 50.2 percent. To 60 grams of this solution was added 225 grams of $H_2O$. This was heated to 50° C. Twelve and one-half grams of epichlorohydrin was added over a period of 10 minutes. Heating was continued at 65° C. until a Gardner Viscosity of greater than E was reached. Then 150 grams of $H_2O$ was added and the solution was cooled to 25° C. Eleven ml. of 10 percent HCl was added to give a pH of 5.1. The product contained 9.5 percent solids and had a viscosity of C.

The resin of each of the examples was separately spread on bleached Kraft paper and tested, and the results are given in Table 1. The polyaminoamide resins prepared with the dimethyl ester gave superior strength both as a cured and uncured resin. This increased strength is apparently caused by some altered mechanism of reaction of the diester with the polyamine since all other variables were held constant.

TABLE 1

| EXAMPLE | % RESIN | ESTER OR ACID USED | WET TENSILE lbs/in | WET TENSILE Cured lbs/in |
|---|---|---|---|---|
| 1(prior art) | 1.0 | Adipic | 5.8 | 8.0 |
| 2 | 1.0 | Dimethyl adipate | 6.5 | 8.7 |
| 3(prior art) | 1.0 | Glutaric | 5.9 | 8.1 |
| 4 | 1.0 | Dimethyl glutarate | 6.2 | 8.3 |

I claim:

1. In a method of preparing a polyaminoamide, including the steps of reacting a polyalkylene polyamine with an alkyl ester of a straight-chain unsubstituted dicarboxylic acid in which the dicarboxylic acid group is (a) aromatic or (b) saturated or unsaturated aliphatic, and contains 2 to 36 carbon atoms in a reaction vessel in the substantial absence of water by adding sufficient heat to the reactants to initiate the reaction, the improvement comprising removing said heat from said reactants to allow the reaction to proceed with the exothermic heat of reaction as substantially the only heat supplied to said reactants until a majority of said reactants have reacted to form a polyaminoamide, while removing an alcohol reaction product from said reaction vessel.

2. The process of preparing a poly-amino-amide resin which comprises heating, in the absence of water, to a temperature at which the reaction is self sustaining, allowing the reaction to proceed in the substantial absence of water and substantially without the addition of further heat until a majority of the reaction is completed, and thereafter heating at a higher temperature in the absence of water until the reaction is substantially complete, (1) one or more unsubstituted alkyl esters of a straight-chain unsubstituted dicarboxylic acid in which the dicarboxylic acid group is (a) aromatic or (b) saturated or unsaturated aliphatic, and contains 2 to 36 carbon atoms and (2) one or more polyamines selected from the group consisting of alkylene diamines and polyalkylenepolyamines which contain at least two amine groups separated by at least two carbon atoms, the mole ratio of the dicarboxylic ester to the polyamine being $$\frac{0.7 \text{ to } 1.25}{1.0}.$$

3. The process of claim 2 in which the dicarboxylic ester is dialkyl carboxylate of acids selected from the group consisting of succinic, glutaric and adipic acids, and mixtures thereof in which the alkyl groups contain 1 to 4 carbon atoms and the mole ratio of polycarboxylic acid ester to polyalkylene polyamine is $$\frac{0.85 \text{ to } 1}{1}.$$

4. The process of claim 2 in which the ester is dimethyl glutarate and the alkylene group of groups in the polyamine contain 2 to 3 carbon atoms, and the mole ratio of polycarboxylic acid ester to polyalkylene polyamine is $$\frac{0.85 \text{ to } 1}{1.}.$$

5. The process of claim 2 in which the number of amino groups in the amine exceeds the number of alkylene groups by 1.

6. The process of claim 2 in which the polyalkylene polyamine is diethylenetriamine.

7. The process of claim 6 wherein the dicarboxylate ester is selected from the group consisting of dimethyl succinate, dimethyl adipate, dimethyl glutarate, and mixtures thereof.

8. The process of claim 7 wherein the dicarboxylate ester is dimethyl adipate and wherein the reaction mixture is heated to a temperature in the range of 120°–125° F. before heat removal and wherein heat is reapplied to hold the temperature at about 140°–150° C. after a majority of the reaction is completed.

9. The process of claim 7 wherein the dicarboxylate ester is dimethyl glutarate and wherein the reaction mixture is heated to a temperature in the range of 120°–130° C. before heat removal.

* * * * *